(12) United States Patent
Fan et al.

(10) Patent No.: US 8,964,655 B2
(45) Date of Patent: Feb. 24, 2015

(54) COOPERATIVE TRAFFIC SCHEDULING

(75) Inventors: Rui Fan, Beijing (CN); Min Wang, Lulea (SE)

(73) Assignee: Telefonaktiebolaget L M Ericssson (publ), Stockholm (SE)

( * ) Notice: Subject to any disclaimer, the term of this patent is extended or adjusted under 35 U.S.C. 154(b) by 745 days.

(21) Appl. No.: 12/597,376

(22) PCT Filed: Jun. 18, 2007

(86) PCT No.: PCT/SE2007/000593
§ 371 (c)(1), (2), (4) Date: Jan. 12, 2010

(87) PCT Pub. No.: WO2008/156382
PCT Pub. Date: Dec. 24, 2008

(65) Prior Publication Data
US 2010/0135232 A1    Jun. 3, 2010

(51) Int. Cl.
H04W 72/12 (2009.01)

(52) U.S. Cl.
USPC .......................................................... 370/329

(58) Field of Classification Search
USPC .......................................................... 370/329
See application file for complete search history.

(56) References Cited

U.S. PATENT DOCUMENTS

| | | | |
|---|---|---|---|
| 5,017,926 A | 5/1991 | Ames et al. | |
| 5,126,748 A | 6/1992 | Ames et al. | |
| 5,485,632 A | 1/1996 | Ng et al. | |
| 5,936,964 A * | 8/1999 | Valko et al. | 370/468 |
| 6,549,517 B1 | 4/2003 | Aweya et al. | |
| 6,690,892 B1 | 2/2004 | Effenberger | |
| 7,016,367 B1 * | 3/2006 | Dyckerhoff et al. | 370/429 |
| 2003/0005145 A1 * | 1/2003 | Bullard | 709/238 |
| 2003/0189943 A1 | 10/2003 | Gorti et al. | 370/412 |
| 2004/0071130 A1 * | 4/2004 | Doerr et al. | 370/352 |
| 2004/0120306 A1 | 6/2004 | Wigard et al. | |
| 2006/0088065 A1 | 4/2006 | Khatter | |
| 2007/0171861 A1 * | 7/2007 | Akhtar | 370/329 |
| 2009/0116434 A1 * | 5/2009 | Lohr et al. | 370/329 |

FOREIGN PATENT DOCUMENTS

| | | |
|---|---|---|
| WO | WO 99/01965 A1 | 1/1999 |
| WO | WO 02/30010 A1 | 4/2002 |

OTHER PUBLICATIONS

Communication with Supplementary European Search Report, EP Application No. EP07748256.0, Dec. 30, 2011.
International Search Report dated Apr. 9, 2008 (3 pages).

* cited by examiner

*Primary Examiner* — Sulaiman Nooristany
(74) *Attorney, Agent, or Firm* — Myers Bigel Sibley & Sajovec, P.A.

(57) ABSTRACT

To reduce and/or guarantee the round-trip delay of interactive processes, cooperative scheduling in forward and backward direction is proposed. In practice, a basic idea is to estimate the delay of packets of different users during network-based scheduling of packets in forward direction. During scheduling of packets in backward direction, packets of those users having larger delay in forward direction are given higher priority based on the estimated delay. In this way the total round-trip delay can be reduced and/or even guaranteed. This means that more users will be satisfied and experience faster connections to services.

19 Claims, 8 Drawing Sheets

COOPERATIVE TRAFFIC SCHEDULING

TECHNICAL FIELD

The present invention generally relates to communication systems, and more particularly to a method and system for reducing and/or handling round-trip delay in such systems.

BACKGROUND

Many processes and/or applications in the field of communication technology such as person-to-person applications are interactive. These interactive processes and/or applications not only care about the one-way delay but also the round-trip delay, such as SIP call control signaling to initiate a session, or Push-to-Talk services over cellular networks. If the round-trip delay of an interactive application is too high, the end user will probably become unsatisfied and quit the application. Therefore it is very important to be able to guarantee or at least reduce the round-trip delay for interactive processes and applications.

In modern communication systems such as packet based wireless systems, like High Speed Packet Access (HSPA) or Long Term Evolution (LTE) systems, there are no special techniques to handle the round-trip delay requirement but just the one-way delay requirement. To guarantee the one-way delay, the scheduler generally gives higher priority to delay-sensitive traffic. In many communication systems, such as HSPA and LTE, scheduling of users is performed from the network side. Since the round-trip delay is composed of two one-way delays, it is viable to guarantee the round-trip delay by guaranteeing each of the one-way delays. However, the solution to reduce the one-way delays to guarantee the round-trip delay has its drawbacks. The major issue is that it can not take full advantage of the allowed round trip delay limitation.

There is thus a general need for an improved strategy for reducing and/or handling round-trip delay in communication systems.

RELATED ART

US Patent Application US 2004/0120306 concerns a data packet scheduling method for third generation wideband CDMA (Code Division Multiple Access) radio access network, and involves allocating scheduling priority to a data packet based on the retransmission status of the data packet.

U.S. Pat. No. 6,690,892 relates to a mechanism for controlling delay in a shared communications network. The delay control method is based on commanding each optical network termination to transmit at a command time that leads the respective desired reception time by respective delay integral time slot duration.

The International Patent Application WO 99/01965 relates to a method for pacing data flow in a packet-based network by arranging data transmission over period of time based upon a set of ascertainable factors about underlying transmission link to derive an intersegment transmission interval.

U.S. Pat. No. 5,017,926 and U.S. Pat. No. 5,126,748 relate to object position determination for dual satellite navigation systems.

SUMMARY

The present invention overcomes these and other drawbacks of the prior art arrangements.

It is a general object of the present invention to reduce the round-trip delay in communication systems.

It is also an object to enable operators and/or service providers to improve the user-perceived quality of service.

These and other objects are met by the invention as defined by the accompanying patent claims.

A basic idea of the invention is to reduce and/or guarantee the round-trip delay of interactive processes by cooperative scheduling in forward and backward direction. In practice, the invention estimates the delay of packets of different users during network-based scheduling of user packets in forward direction. During scheduling of user packets in backward direction, packets of those users having larger delay in forward direction are given higher priority (based on the estimated delay). In this way the total round-trip delay can be reduced and/or even guaranteed. This means that more users will be satisfied and experience faster connections to services.

Additional delay information such as information about delay experienced in an external network system may optionally be taken into consideration when prioritizing user traffic in backward direction.

The invention is generally applicable to communication systems where round-trip delay is an important issue. For example, the invention may be applied to any modern and future generation communication systems employing network-based multi-user scheduling. In particular, the invention may be applied to wireless systems such as mobile network systems by implementing delay-cooperative uplink and downlink scheduling.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS

Throughout the drawings, the same reference characters will be used for corresponding or similar elements.

For a better understanding of the invention, it may be useful to begin with a brief overview of network-based multi-user scheduling in an exemplary network environment like a modern/future wireless communication system such as HSPA or LTE.

For example, HSPA is generally based on High Speed Downlink Packet Access (HSDPA) in the downlink and Enhanced Uplink (EUL) in the uplink. The Enhanced Uplink (EUL) is sometimes referred to as High Speed Uplink Packet Access (HSUPA)

HSDPA is an enhancement to WCDMA that provides a smooth evolutionary path to higher data rates. HSDPA is specified in 3GPP release 5, and includes additional transport and control channels such as the High-Speed Downlink Shared Channel (HS-DSCH). EUL is specified in 3GPP release 6 and includes additional transport and control channels such as the Enhanced Dedicated Channel (E-DCH).

HSDPA (High Speed Data Packet Access) enables improvements in capacity and end-user perception by means of efficient sharing of common resources in the cell among many users, rapid adaptation of the transmission parameters to the instantaneous radio channel conditions, increased peak bit rates and reduced delays. Fast scheduling is a mechanism that selects which users to transmit to in a given transmission time interval (TTI). The packet scheduler is a key element in the design of a HSDPA system as it controls the allocation of the shared resources among the users and to a great extent determines the overall behavior of the system. In fact, the scheduler decides which users to serve and, in close cooperation with the link adaptation mechanism, which modulation, power and how many codes should be used for each user. This produces the actual end-users bit rate and system capacity. The HS-DSCH downlink channel is shared between users using channel-dependent scheduling to take advantage of favorable channel conditions in order to make best use of the available radio resources.

Similarly to HSDPA in the downlink, there will be a packet scheduler for E-DCH in the uplink, but it will normally operate on a request-grant principle, where the user equipment (UE) or terminal requests permission to send data and the scheduler on the network side decides when and how many terminals will be allowed to do so. A request for transmission will normally contain data about the state of the transmission data buffer and the queue at the terminal side and its available power margin. The standard foresees two basic scheduling methods. Long term grants are issued to several terminals which can send their data simultaneously using code multiplexation. Short term grants on the other hand allow multiplexing of terminals in the time domain.

The inventors have recognized that for those applications/processes whose forward packets are delayed in one direction, the round-trip delay requirement can still be satisfied if the corresponding backward packets are given higher priority and thus transmitted more quickly. However, since forward and backward traffic scheduling are completely independent of each other in the prior art systems of today, a system re-design is required. In prior art systems, those applications which experience larger forward delay may also experience larger delay in backward traffic again. This means that the round trip delay requirement can not be guaranteed in conventional systems and end users will therefore generally not be satisfied. In addition, the capacity for this kind of process/application will ultimately be reduced.

Round-trip delay normally means the period of time for the signaling to go to a remote location and back again (back and forth). This could for example be some form of request-response signaling, where a request is transmitted in the forward direction and a corresponding response comes back in the opposite or backward direction. The round-trip delay is naturally composed of two one-way delays, one in the forward direction and one in the backward direction.

Figure 1:
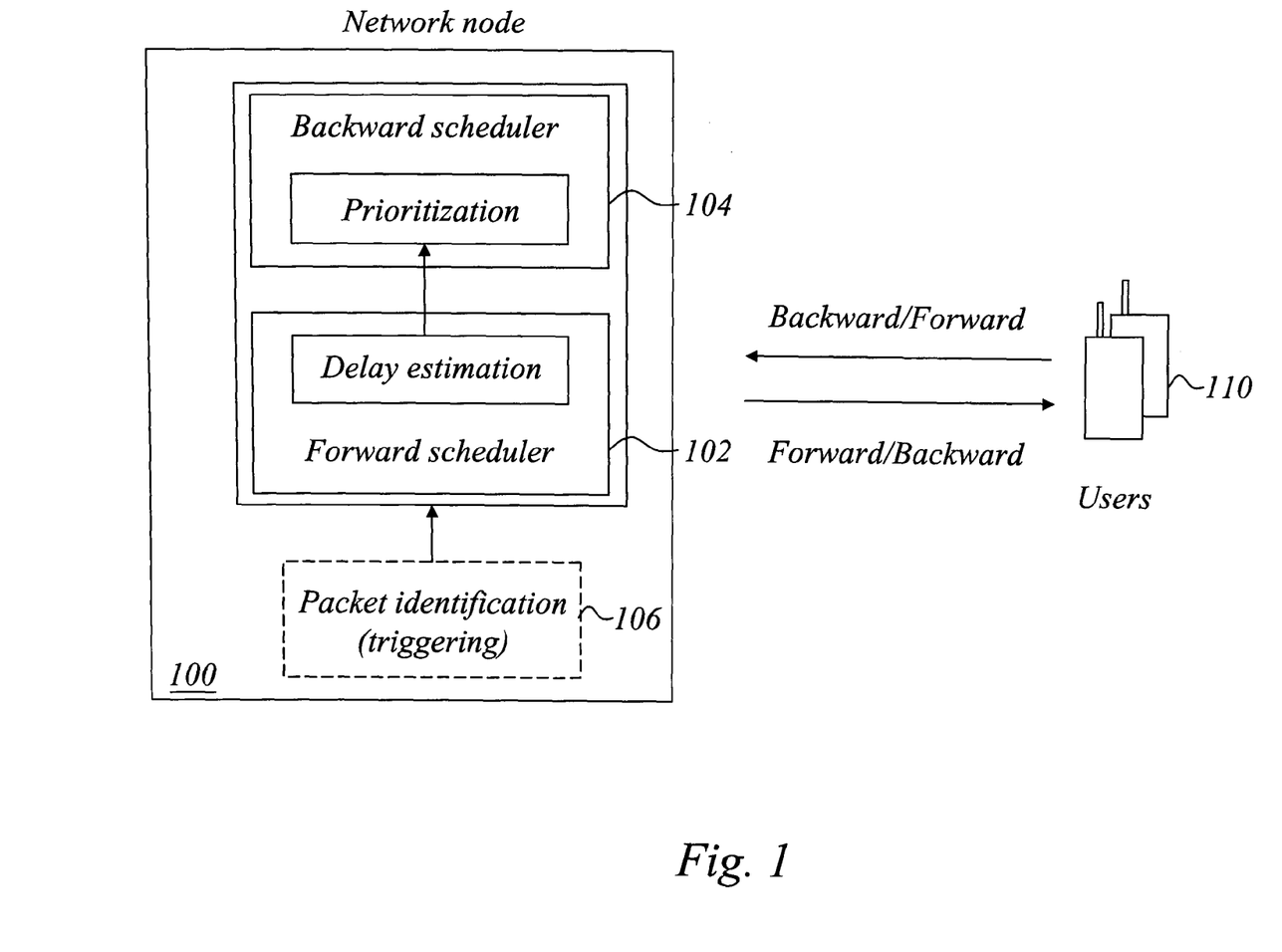
FIG. 1 is a schematic block diagram illustrating a network node in communication with user devices according to a preferred exemplary embodiment of the invention.

FIG. 1 is a schematic block diagram illustrating a network node in communication with user devices according to a preferred exemplary embodiment of the invention. The network node 100 basically comprises a forward scheduler 102, a backward scheduler 104, and an optional packet identification module 106. The network node 100 is preferably configured for network-based multi-user scheduling, e.g. similar to downlink scheduling in HSDPA and/or uplink scheduling of EUL. In accordance with the proposed technology, the forward scheduler 102 comprises a delay estimation unit for estimating the delay of packets of different users during scheduling of user packets in forward direction. The backward scheduler 104 comprises a prioritization unit that receives information about estimated delay from the forward scheduler for prioritizing, during scheduling of user packets in backward direction, packets of those users having larger delay in forward direction. In essence, the backward scheduler 104 gives higher priority to packets of users that have already experienced a large amount of delay. In this way, the total round-trip delay can be reduced, and the users will experience a much higher quality of service. In this example, the directions are defined between the scheduling network node on one side and the various users on the other side. The forward direction is generally defined as the direction of the initial communication, whereas the backward direction is the opposite return direction. This means that the directions "forward" and "backward" may vary depending on which part that initiates the session.

The optional packet identification module 106 may be used as a trigger for the proposed delay-cooperative scheduling. Preferably the packet identification module 106 is configured to identify packets associated with interactive processes, and trigger the delay-cooperative scheduling including delay estimation and packet prioritization only for packets of interactive processes.

In an exemplary embodiment, information representative of the estimated delay is stored in a shared memory (not shown) by the forward scheduler 102 and subsequently accessed from this shared memory by the backward scheduler 104.

For example, the network node 100 may be a radio network controller or a base station communicating with users in an associated network coverage area.

Figure 2:
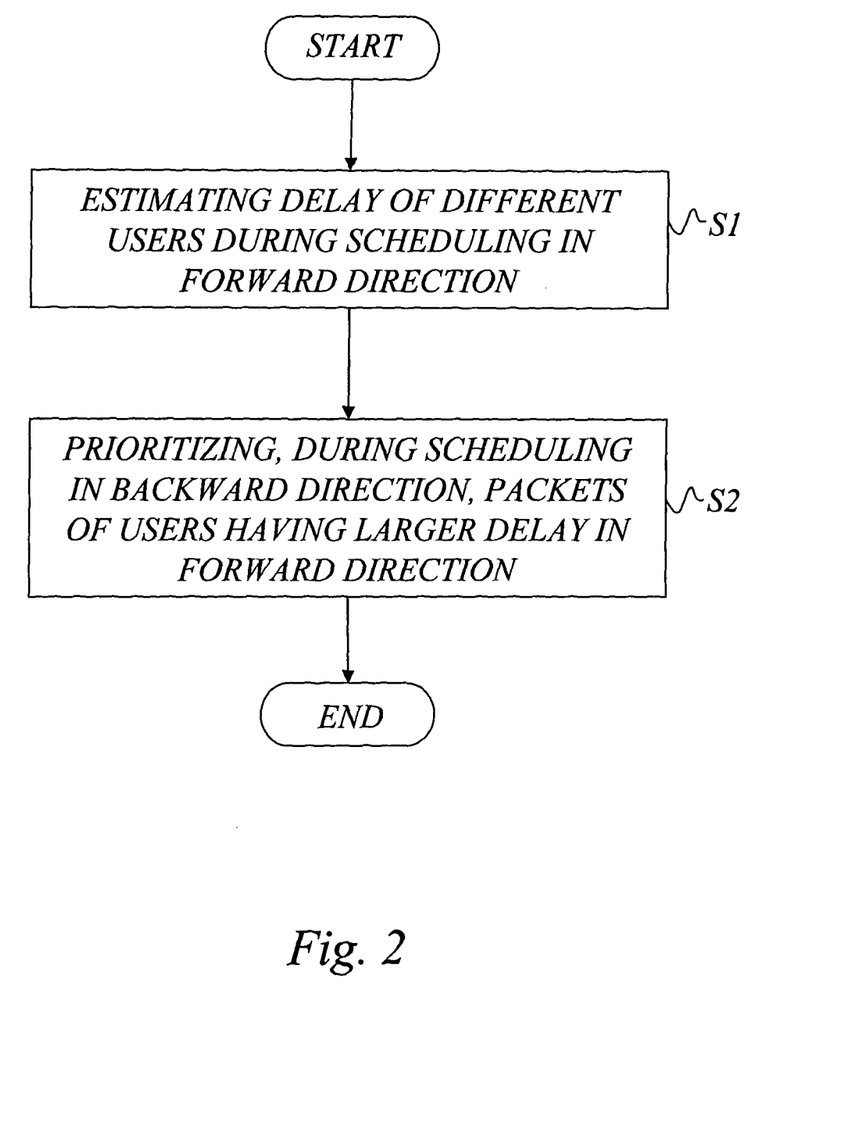
FIG. 2 is a schematic flow diagram illustrating a method for reducing round-trip delay according to a preferred exemplary embodiment of the invention.

A basic mode of operation according to a preferred exemplary embodiment is also illustrated in the flow diagram of FIG. 2. In step S1, the delays of different users during scheduling in the forward direction are estimated. In the next step S2, packets of users that experienced a larger delay (than other packets) in forward direction are prioritized during scheduling in the backward direction so as to minimize the total round-trip delay for as many users as possible. In the end, this means that more users will be satisfied and experience faster connections to services. Also, the capacity of the interactive applications may increase.

The invention is particularly useful for reducing round-trip delay for interactive processes and/or applications such as SIP call control, Push-to-Talk services, ACK/NACK data services, interactive games, conference services and so forth. The process does not have to be initiated at the application layer, but can also occur at the MAC (Medium Access Control) layer or even the physical layer.

Figure 3:
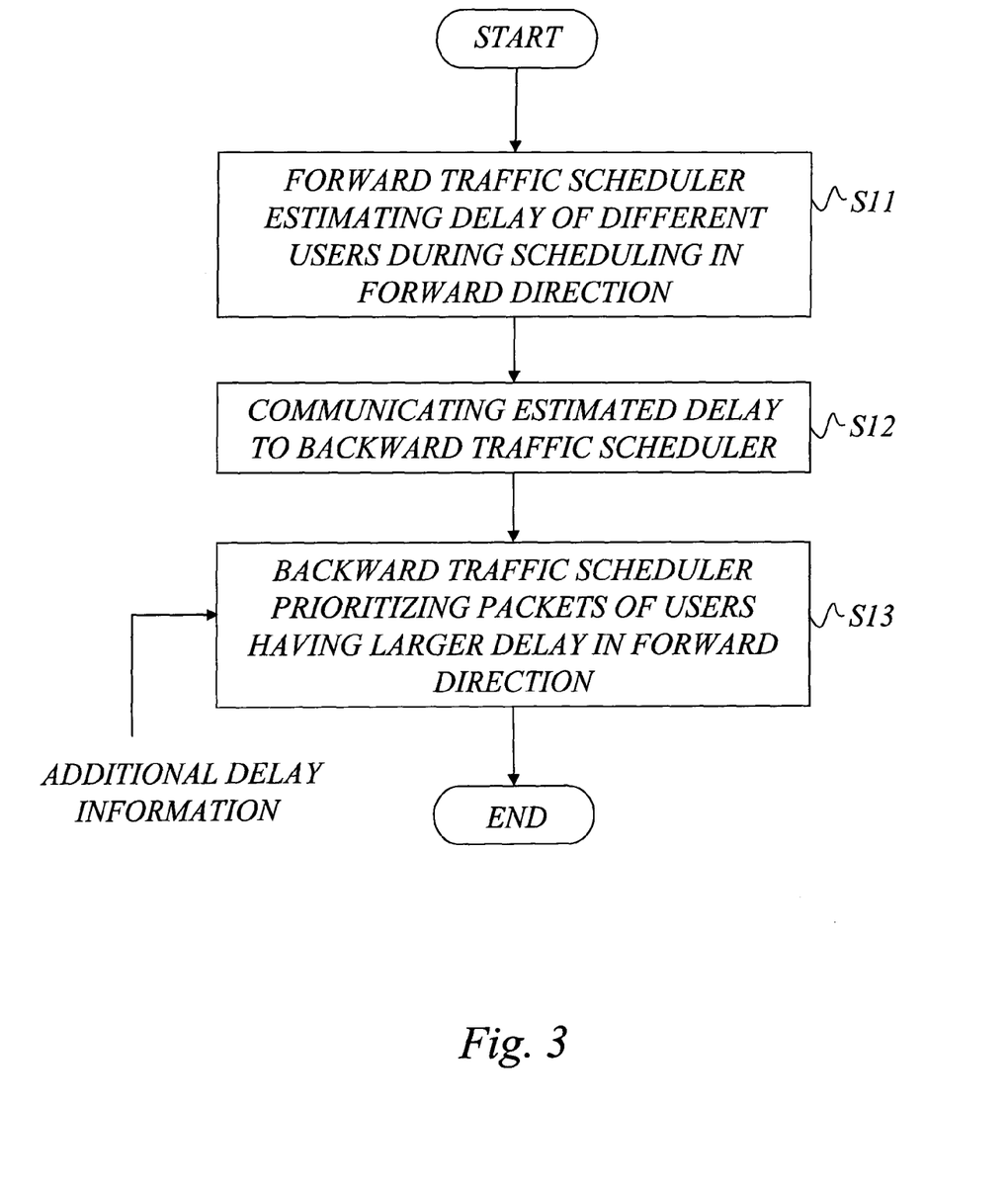
FIG. 3 is a schematic flow diagram illustrating a more detailed example of how to implement a reduction of round-trip delay according to an embodiment of the invention.

FIG. 3 is a schematic flow diagram illustrating a more detailed example of how to implement a reduction of round-trip delay according to an embodiment of the invention. In step S11, the forward traffic scheduler estimates the delay of different users during scheduling in forward direction. Next, information about the estimated delay is communicated to the correspondent backward traffic scheduler in step S12. The backward traffic scheduler then sorts the packets and corresponding users according to the experienced amount of delay, and prioritizes packets of those users that have larger delay than other users in the forward direction, as indicated in step S13.

Optionally, additional delay information such as information about delay experienced in an external network system may be taken into consideration when prioritizing user traffic in the backward direction. For example, it is possible to associate a packet with an outgoing time stamp when the packet enters into the external network. Later, when the packet returns from the external network, the delay in the external network can be calculated based on the time stamp.

Figure 4:
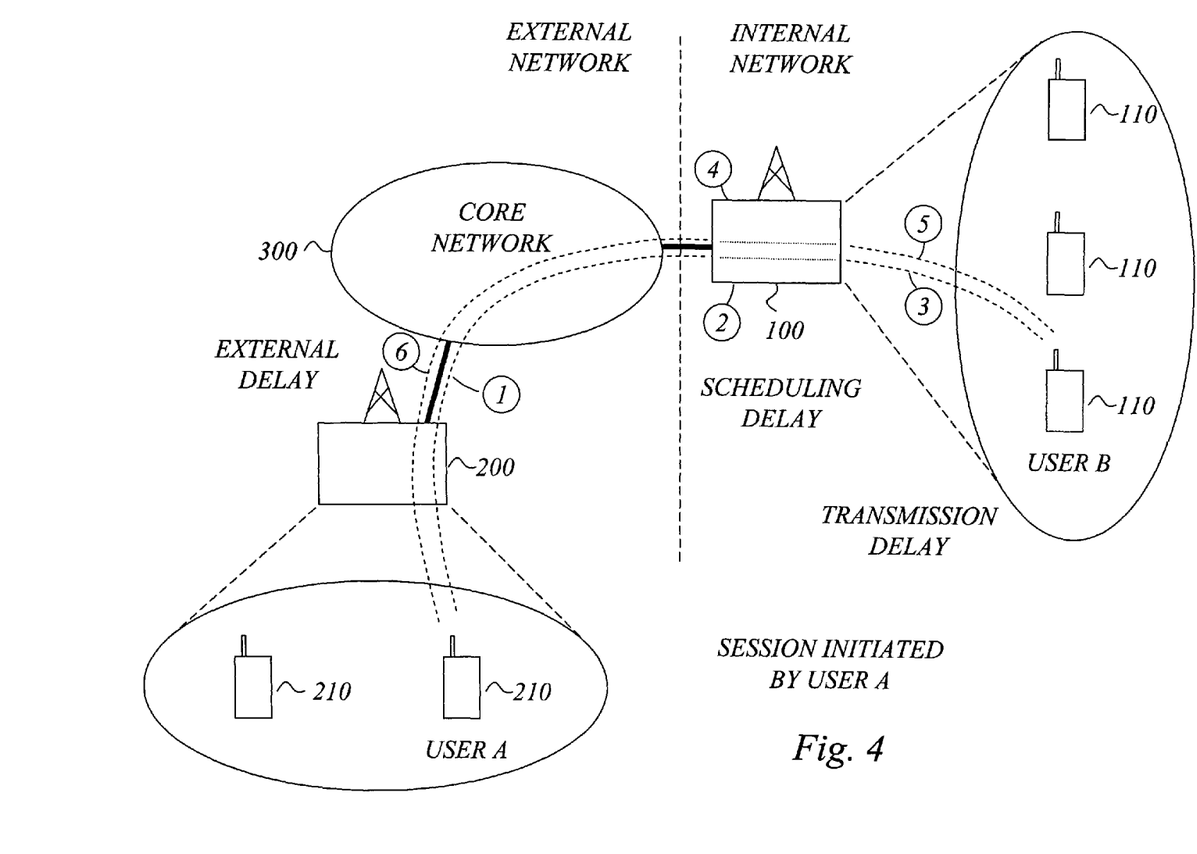
FIG. 4 is a schematic diagram illustrating an overview of a system for communication between a first user located in an internal network and an externally located user, when the session is initiated by the external user.

FIG. 4 is a schematic diagram illustrating an overview of a system for communication between a first user located in an internal network and an externally located user, when the session is initiated by the external user. Assume there is a session between user A 210 and user B 110. User A 210 is located in an external network, which comprises a base station 200 or similar network node such as a NodeB or RNC (Radio Network Controller). User B 110 is located in an internal network, which comprises a base station 100 or similar network node. The base station 100 in the internal network is configured for serving a number of users 110. It is connected to the base station 200 via a core network 300. The base station 200 may also serve a number of users 210.

In this particular example, the session between user A and user B is initiated by user A 210. The whole round-trip delay for communication between user A and user B may be classified as follows:

1. Delay from user A in the external network to the scheduler in network node 100.
2. Downlink scheduling delay for user B.
3. Transmission delay between scheduler in node 100 and user B (small).
4. Uplink scheduling delay for user B.
5. Transmission delay between user B and scheduler in node 100 (small).
6. Delay from scheduler in node 100 to user A over the external network.

It is assumed that transmission delays 3 and 5 are very small and almost fixed for different users, and therefore these delays will be neglected in the following. It is difficult to control delay 6. Delay 1 is also difficult to know, but if it can be estimated, it may be advantageous to use this information. Anyway, the downlink scheduler in node 100 preferably estimates delay 2, alternatively delay 1 plus delay 2. If the estimated delay or sum of delays is relatively large compared to packets of other users or compared to some threshold value (e.g. estimated by trial-and-error or based on some suitable rule of thumb), it is desirable to try to reduce delay 4 by letting the uplink scheduler prioritize the uplink traffic of user B. For uplink scheduling, packets are buffered in the UE while scheduling of grants is done from the network side.

Figure 5:
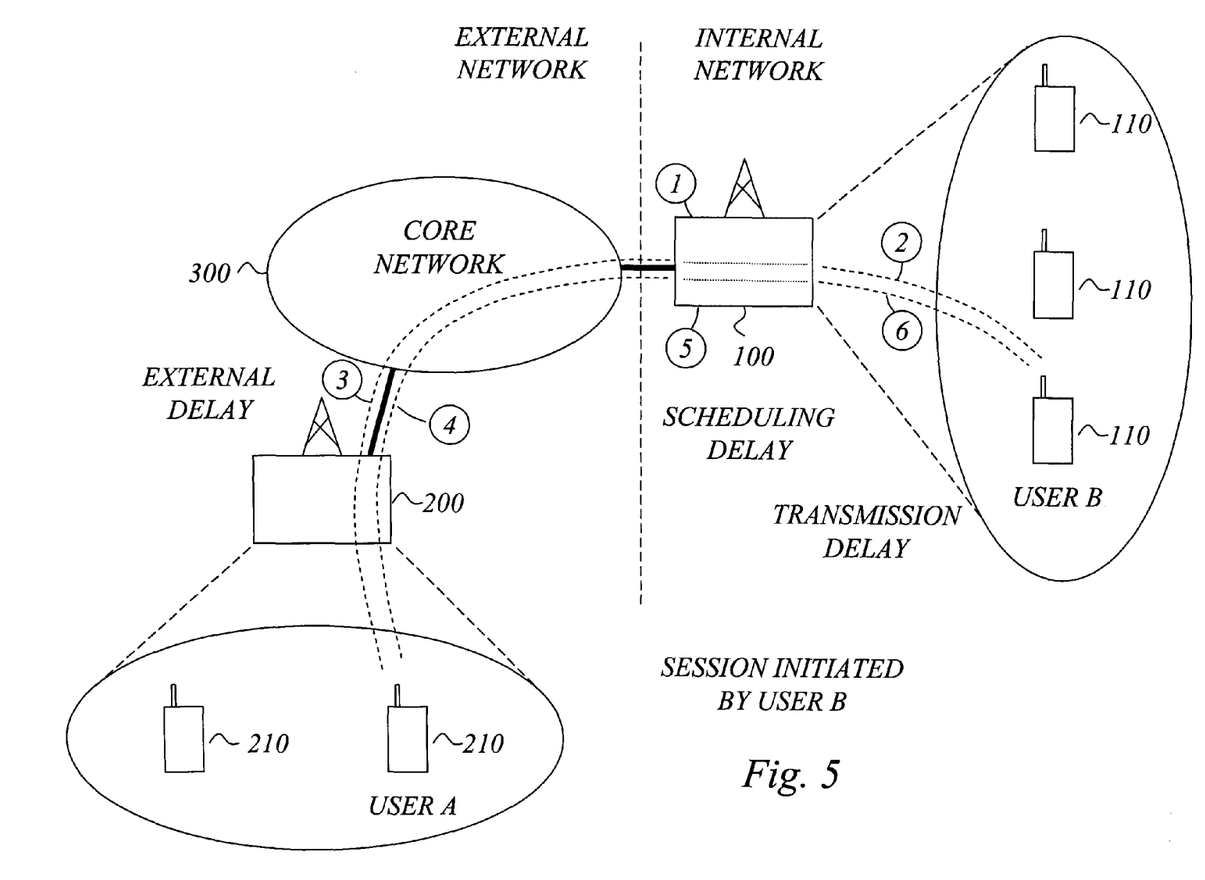
FIG. 5 is a schematic diagram illustrating an overview of a system for communication between a first user located in an internal network and an externally located user, when the session is initiated by the internal user.

FIG. 5 is a schematic diagram illustrating an overview of a system for communication between a first user located in an internal network and an externally located user, when the session is initiated by the internal user. In this particular example, the session between user A and user B is initiated by user B 110. The whole round-trip delay for communication between user B and user A may be classified as follows:

1. Uplink scheduling delay for user B.
2. Transmission delay between user B and scheduler in node 100 (small).
3. Delay from scheduler in network node 100 to user A over the external network.
4. Delay from user A back to scheduler in node 100.
5. Downlink scheduling delay for user B.
6. Transmission delay between scheduler in node 100 and user B (small).

It is assumed that transmission delays 2 and 6 are small, and therefore these delays will be neglected in the following. The scheduler knows or estimates delay 1, and may optionally also estimate delays 3 and 4 in the external network. If the estimated delay or sum of delays is relatively large it is desirable to try to reduce delay 5 by letting the downlink scheduler prioritize the downlink traffic of user B.

In this case, the uplink scheduler or any other appropriate unit in the network node 100 may optionally time-stamp out-going packets (entering the external network) and send the time-stamp information to the correspondent downlink scheduler. In this way, the downlink scheduler may calculate the delay experienced in the external network, from scheduler to user A and back, by using the time-stamp. The downlink scheduler in network node 100 may then try to reduce the delay 5 if the sum of delays 1, 3 and 4 is relatively large compared to packets of other users or compared to some given threshold.

The interaction considered by the invention can be between user-to-user, host-to-host, and user-to-host or vice versa, and may involve nodes such as UEs, Node Bs and/or RNCs. The definition of round-trip delay depends on the locations of the communicating nodes. The round-trip delay between two users (UE—User Equipment) is generally larger than the round-trip delay between a user and a corresponding base station (e.g. Node B). The round-trip delay between two users preferably includes not only the delay in the scheduler, but also the delay in the external network. The round-trip delay between a user and its corresponding base station does generally not include any external network delay.

Figure 6:
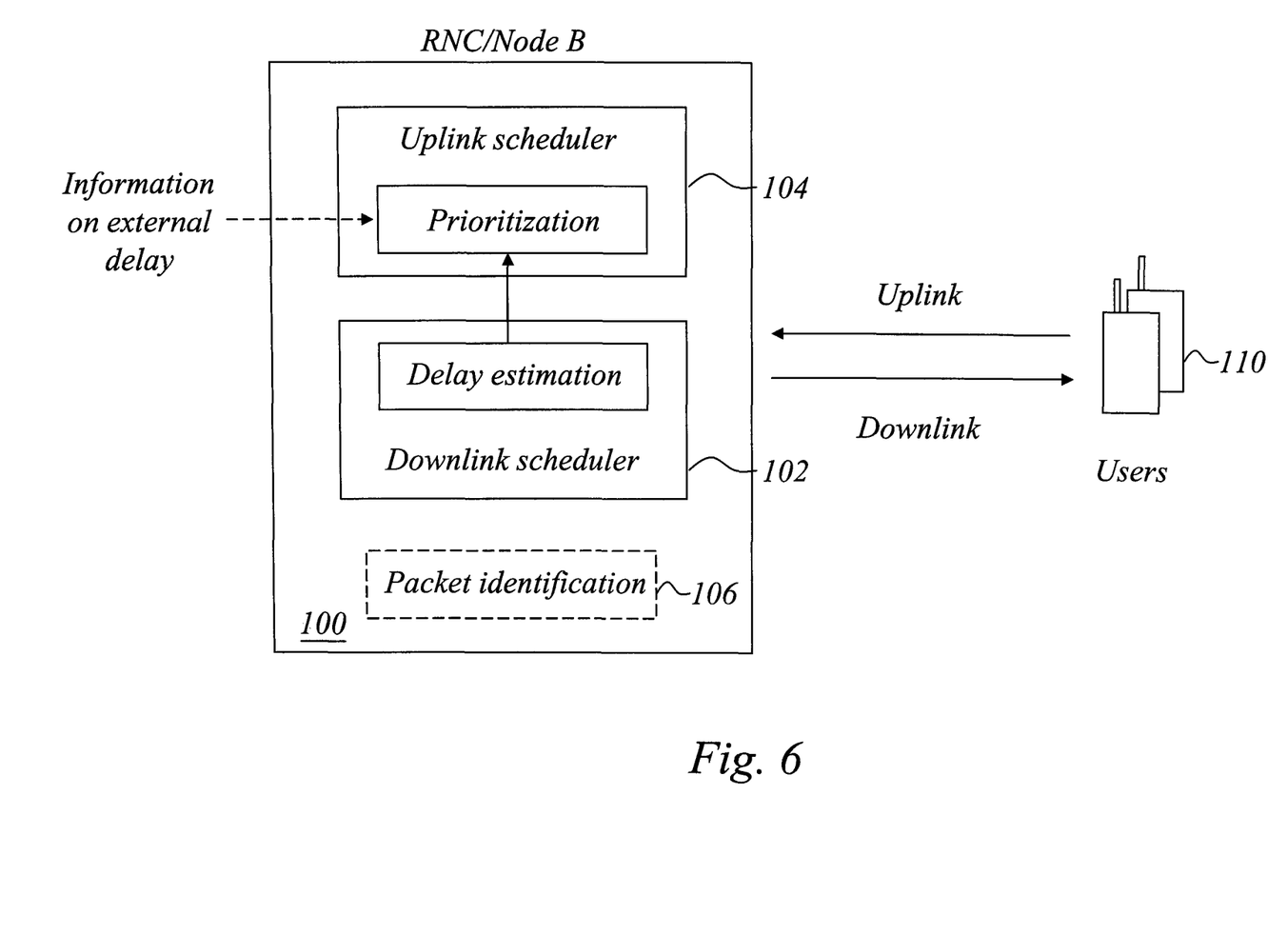
FIG. 6 is a schematic block diagram illustrating a wireless network node with cooperative downlink and uplink schedulers according to an exemplary embodiment of the invention.

FIG. 6 is a schematic block diagram illustrating a wireless network node with cooperative downlink and uplink schedulers according to an exemplary embodiment of the invention. In this example, the network node (e.g. RNC/Node B) 100 preferably comprises a downlink scheduler 102, an uplink scheduler 104 and an optional packet identification unit 106. The downlink scheduler 102 comprises a delay estimation unit for estimating the downlink scheduling related delay, and for informing the uplink scheduler 104 of this delay. The uplink scheduler 104 comprises a prioritization unit for sorting users/packets according to downlink scheduling delay, and for prioritizing packets of those users having larger delay. For example, if the uplink scheduler is configured for request-grant scheduling similar to that of HSPA systems, the grants are preferably allocated to the users at least partly in dependence on the estimated delay during downlink scheduling.

The prioritization unit may receive additional delay information such as information on external delay, which may be useful in the prioritization procedure.

The optional packet identification unit 106 is preferably configured for identifying packets associated with interactive processes and/or interactive applications, and for controlling the delay estimation and prioritization procedure so that only packets of interactive processes/applications are processed. In the example of FIG. 6, the downlink direction is the so-called forward direction.

As previously mentioned, it is desirable to guarantee or at least reduce the round trip delay for interactive processes. Previously, delay sensitive schedulers only considered the one way delay experienced by packets. The invention considers the round trip delay of the interactive process during scheduling. For each incoming packet (belonging to the interactive traffic), the downlink scheduler 102 preferably records the duration that the packet stays in the scheduler. The duration normally starts at the time when the packet enters into downlink scheduler and ends at the time when it leaves from downlink scheduler. The downlink scheduler 102 communicates this delay information to its correspondent uplink scheduler 104. When the uplink scheduler 104 receives a request from a user (UE) to transmit outgoing traffic, the uplink scheduler would give higher priority to those UE whose incoming traffic has experienced larger downlink delay so that these UE can transmit reverse outgoing traffic faster. In this way, the round trip delay requirement can be reduced or guaranteed.

In a particular exemplary embodiment, the invention is adapted for implementation in a 3G LTE (Long Term Evolution) network. Both uplink and downlink schedulers normally reside in eNodeB. Various methods can be used to reflect application layer information in the header of L2, e.g. as described in our co-pending U.S. Patent Application 60/824242, filed Aug. 31, 2006. The eNodeB has the possibility to scan the header of the incoming packets so that it will know if the incoming traffic belongs to interactive processes/applications or not. If the incoming packet belongs to an interactive process/application, the eNodeB can record the duration that the packets stays in its scheduling buffer and then use this information for uplink scheduling. Since it is possible that one request message from an upper layer may be segmented into several packets in a lower layer and transmitted to the UE at different times, the eNodeB can normally just record the duration that the latest segment stays in its buffer. This is because only when the UE receives all the segments of the request message can it send a corresponding response message. There are several ways to communicate the delay information to the uplink scheduler. Since both the downlink scheduler 102 and uplink scheduler 104 coexist in eNodeB, it is for example possible to share a common memory between the uplink and downlink schedulers. Preferably, the downlink scheduler preferably writes the delay information into the tail of this memory while the uplink scheduler reads the delay information from the head of the memory. Another way to communicate this delay information is to use RPC (Remote Procedure Call) like functionality. Since it may be resource-consuming to communicate this delay information each time when an item of delay information is recorded, the downlink scheduler 102 may rather communicate this information to uplink scheduler 104 at some specified time interval.

The uplink scheduler 104 may thus allocate grants according to the delay information that it has received. When a user sends a request for grant to the uplink scheduler for transmission, the uplink scheduler checks the delay information. The uplink scheduler typically first allocates grant to the user(s) that experienced larger downlink delay in downlink scheduler, if there are still resources available, and then the uplink scheduler grants resources to the user(s) with less delay. Only with grant can users transmit packets. In this way, we can guarantee that reverse outgoing traffic whose incoming traffic has been delayed will be transmitted more quickly.

Figure 7:
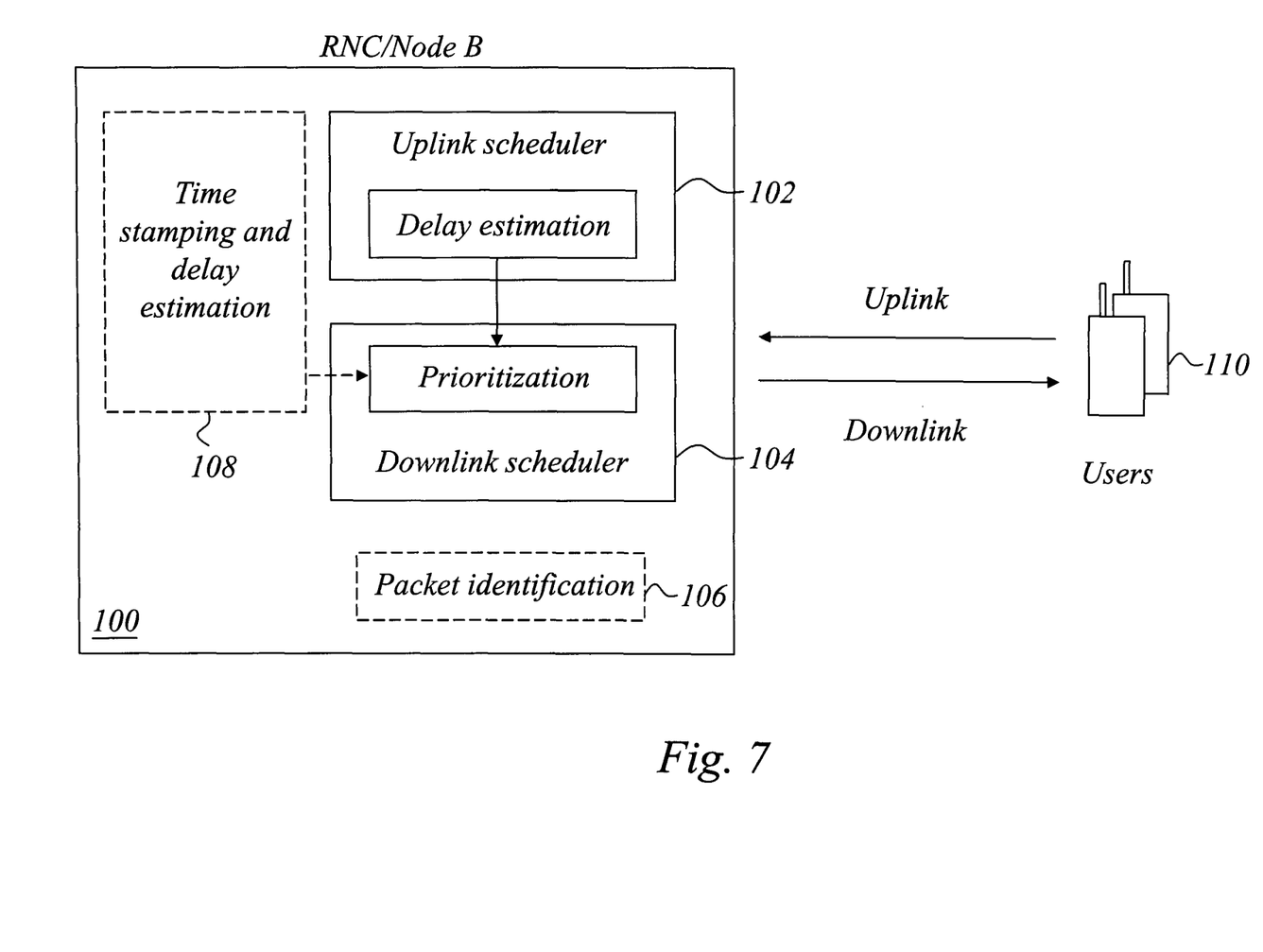
FIG. 7 is a schematic block diagram illustrating a wireless network node with cooperative downlink and uplink schedulers according to another exemplary embodiment of the invention.

FIG. 7 is a schematic block diagram illustrating a wireless network node with cooperative downlink and uplink schedulers according to another exemplary embodiment of the invention. In this example, the uplink scheduler is the "forward scheduler" and the downlink scheduler is the "backward scheduler". This means that the uplink direction is the so-called forward direction. The network node (e.g. RNC/Node B) 100 comprises an uplink (forward) scheduler 102, a downlink (backward) scheduler 104, an optional packet identification unit 106 and optional time stamping unit 108. In this embodiment, the uplink scheduler 102 comprises a delay estimation unit for estimating the uplink scheduling related delay, and for informing the downlink scheduler 104 of this delay. The downlink scheduler 104 comprises a prioritization unit for sorting users/packets according to uplink scheduling delay, and for prioritizing packets of those users having larger delay. The optional time stamping unit 108 is configured for time-stamping outgoing packets destined for an external network so that external delay may be estimated when the packet returns. The time-stamping may alternatively be implemented in the uplink scheduler, and the external delay estimation based on the time stamp may alternatively be performed in the downlink scheduler. Anyway, information on the external delay may be used by the prioritization unit when prioritizing packets.

Figure 8:
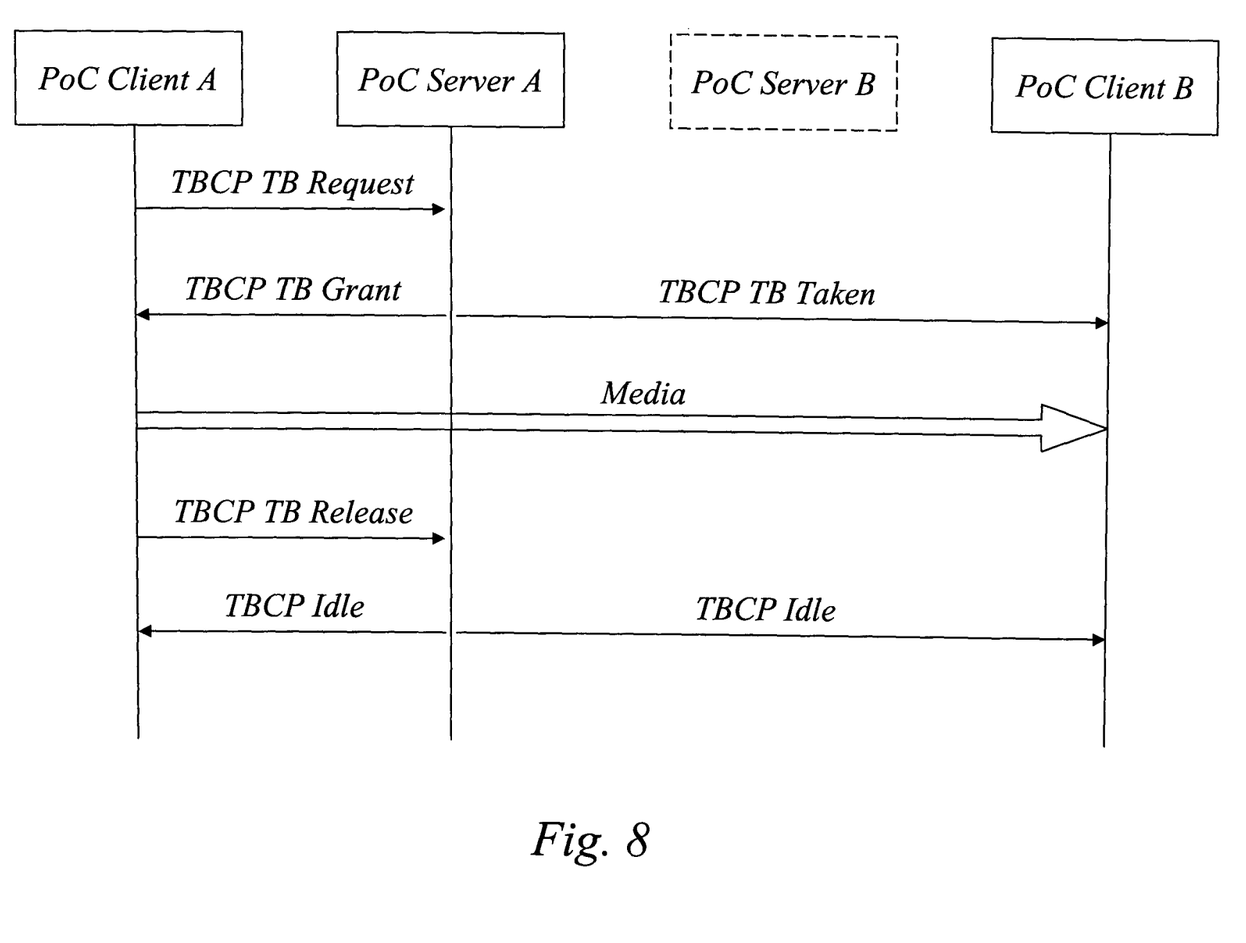
FIG. 8 is a schematic signaling diagram of an exemplary Push-to-Talk control signaling procedure.

FIG. 8 is a schematic signaling diagram of an exemplary Push-to-Talk control signaling procedure. For example, for Push-to-talk over Cellular (PoC) services, the overall process basically comprises a session establishment signaling procedure, a talk burst control signaling procedure and finally a media communication procedure. For session establishment, the Session Initiation Protocol (SIP) may be used. For talk burst control, the Talk Burst Control Procedure (TBCP) may be used. FIG. 8 illustrates an example of the TBCP procedure, which is an important interactive procedure with respect to round-trip delay. TBCP is used for making sure only one participant in a PoC session gets the floor and can send media at a given time. The involved nodes include PoC client A, PoC server A, PoC server B, PoC client B. The PoC server A control the talk burst while PoC server B just participate in the session.

When client A wants to talk, it will send a message TBCP TB Request to PoC server A with a request to allocate resources to the client. If no client occupies the floor, PoC server A notifies client A that it has been granted the floor and thus can use the media resources, i.e. to "talk" and communicate. At the same time, PoC server A also notifies client B that the floor has been granted to client A. Then client A can "talk" to client B. When the talk burst of client A is over, client A sends a TBCP TB Release message to server A to notify the server that the resources will be released. Upon receiving this message, server A notifies client B with a TBCP TB Idle message, thus informing client B that the floor is available again.

The TBCP messages represent a good example of an interactive process where round-trip delay is important. A PoC client can not talk until it receives a TBCP TB grant from the PoC server, and these messages normally go through NodeB (scheduler) back and forth.

The embodiments described above are merely given as examples, and it should be understood that the present invention is not limited thereto. The invention is generally applicable to any communication systems where round-trip delay is an important issue. Further modifications, changes and improvements which retain the basic underlying principles disclosed and claimed herein are within the scope of the invention.

The invention claimed is:

1. A method for reducing round-trip delay for interactive processes in a communication system that operates based on network-based multi-user packet scheduling, said method comprising:

selecting packets associated with interactive processes and not selecting packets associated with non-interactive processes from among a plurality of packets associated with the interactive processes and the non-interactive processes, wherein the selected packets correspond to at least one type of communication for at least one of Push-to-Talk services, ACK/NACK data services, and interactive games;

responsive to the selection, estimating delay of the packets associated with the interactive processes of different users during network-based scheduling of user packets in a forward direction;

communicating information representative of said estimated delay between a first scheduler for scheduling of user packets in the forward direction and a corresponding second scheduler for scheduling of user packets in a backward direction; and prioritizing, during network-based scheduling of user packets in the backward direction and based on said estimated delay, the packets associated with the interactive processes of those users experiencing a larger delay in the forward direction than a delay experienced by other users in the forward direction, so that the round-trip delay can be reduced, where said information representative of said estimated delay is stored in a shared memory by the first scheduler and accessed from said shared memory by the second scheduler.

2. The method of claim 1, further comprising;

estimating delay experienced by a packet associated with the interactive processes in an external network system, and where said prioritizing is based on both estimated delay during network-based scheduling of user packets associated with the interactive processes in the forward direction, and estimated delay experienced in the external network system.

3. The method of claim 2, where said estimating delay experienced by a packet associated with the interactive processes in the external network system comprises:

associating the packet with an outgoing time stamp when the packet enters into the external network; and calculating, when the packet returns from the external network, the delay based on the time stamp.

4. The method of claim 1, where said communication system is a wireless communication system, and where said scheduling in the forward direction is downlink scheduling and said scheduling in the backward direction is uplink scheduling.

5. The method of claim 4, where said uplink scheduling is request-grant scheduling of users, and where grants are allocated to users at least partly in dependence on estimated delay during downlink scheduling.

6. The method of claim 1, where said communication system is a wireless communication system, and where said scheduling in the forward direction is uplink scheduling and said scheduling in the backward direction is downlink scheduling.

7. The method of claim 1, where said estimating and said prioritizing are performed on a network side of the communication system.

8. The method of claim 1, where said communication system is a wireless communication system, and where said estimating and said prioritizing are performed by a radio network controller or a base station communicating with users in an associated network coverage area.

9. An arrangement for reducing round-trip delay for interactive processes in a communication system that operates based on network-based multi-user packet scheduling, said arrangement comprising:

a packet identification module for selecting packets associated with interactive processes and not selecting packets associated with non-interactive processes from among a plurality of packets associated with the interactive processes and the non-interactive processes, wherein the packet identification module identifies packets corresponding to at least one type for communications for at least one of Push-to-Talk services, ACK/NACK data services, and interactive games;

a delay estimation module configured to, responsive to the selection:

estimate delay of packets of different users during network-based scheduling of user packets in a forward direction; and communicate information representative of said estimated delay between a first scheduler for scheduling of user packets in the forward direction and a corresponding second scheduler for scheduling of user packets in the backward direction, where said communicating information is based on a shared memory in which said information representative of said estimated delay is stored by the first scheduler and from which said information is accessed by the second scheduler, a prioritization module configured to prioritize communication of, during network-based scheduling of user packets in the backward direction and based on said estimated delay, the packets associated with the interactive processes of those users experiencing a larger delay in the forward direction than a delay experienced by other users in the forward direction, so that the round-trip delay can be reduced.

10. The arrangement of claim 9, where said prioritizing module is further configured to prioritize packets associated with the interactive processes based on estimated delay during network-based scheduling of user packets in the forward direction, as well as estimated delay experienced in an external network system.

11. The arrangement of claim 10, where the delay estimation module is further configured for:

estimating delay experienced by a packet in the external network system.

12. The arrangement of claim 11, where the delay estimation module is further configured to:

associate the packet with an outgoing time stamp when the packet enters into the external network; and calculate, when the packet returns from the external network, the delay based on the time stamp.

13. The arrangement of claim 9, where said communication system is a wireless communication system, and where said scheduling in the forward direction corresponds to downlink scheduling and said scheduling in the backward direction corresponds to uplink scheduling.

14. The arrangement of claim 9, where said communication system is a wireless communication system, and where said scheduling in the forward direction corresponds to uplink scheduling and said scheduling in the backward direction corresponds to downlink scheduling.

15. A network node having a first scheduler for multi-user packet scheduling in a forward direction and a second scheduler for multi-user packet scheduling in a backward direction, where said network node further comprises:
a packet identification module for selecting packets associated with interactive processes and not selecting packets associated with non-interactive processes from among a plurality of packets associated with the interactive processes and the non-interactive processes,
wherein the packet identification module identifies packets corresponding to at least one type for communications for at least one of Push-to-Talk services, ACK/NACK data services, and interactive games;
a delay estimation module configured for, responsive to the selection:
estimating delay of packets of different users during scheduling of user packets in said forward direction;
communicating information representative of said estimated delay between said first scheduler and said second scheduler to enable cooperative scheduling, where said information representative of said estimated delay is stored in a shared memory by the first scheduler and accessed from said shared memory by the second scheduler; and
a prioritization module for prioritizing, during scheduling of user packets in said backward direction and based on said estimated delay, the packets associated with the interactive processes of those users experiencing a larger delay in said forward direction than a delay experienced by other uses in the forward direction, so that round-trip delay can be reduced.

16. The network node of claim 15, where said prioritization module is further configured to prioritize packets based on estimated delay during scheduling of user traffic in the forward direction, as well as estimated delay experienced in an external network system.

17. The network node of claim 15, where said first scheduler is a downlink scheduler and said second scheduler is an uplink scheduler.

18. The network node of claim 5, where said first scheduler is an uplink scheduler and said second scheduler is a downlink scheduler.

19. The network node of claim 15, where said network node is a radio network controller or a base station in a wireless communication system.

* * * * *